(12) United States Patent
Jiang

(10) Patent No.: US 6,651,525 B2
(45) Date of Patent: Nov. 25, 2003

(54) HEAD SET ASSEMBLY FOR BICYCLES

(76) Inventor: Cheng-Xun Jiang, No. 447, Guojing Rd., Dali City, Taichung (TW)

( * ) Notice: Subject to any disclaimer, the term of this patent is extended or adjusted under 35 U.S.C. 154(b) by 10 days.

(21) Appl. No.: 10/028,675

(22) Filed: Dec. 28, 2001

(65) Prior Publication Data

US 2003/0121357 A1 Jul. 3, 2003

(51) Int. Cl.$^7$ .......................... B62K 21/12; F16B 7/04; F16C 33/66; F16C 43/00
(52) U.S. Cl. ...................... 74/551.1; 403/371; 280/279; 384/540; 384/517
(58) Field of Search .............................. 74/551.1–551.8; 280/279; 403/371, 370, 368, 372, 373; 384/540, 516, 517

(56) References Cited

U.S. PATENT DOCUMENTS

| | | | | |
|---|---|---|---|---|
| 4,189,167 A | * | 2/1980 | Dubois | 280/279 |
| 4,445,703 A | * | 5/1984 | Tange | 280/279 |
| 4,531,756 A | * | 7/1985 | Mori | 280/279 |
| 5,246,296 A | * | 9/1993 | Chi | 384/540 |
| 5,330,220 A | * | 7/1994 | Nagano | 280/279 |
| 5,893,574 A | * | 4/1999 | Campagnolo | 280/279 |
| 5,918,895 A | * | 7/1999 | Chi | 280/279 |
| 5,964,474 A | * | 10/1999 | Chen | 74/551.1 X |
| 6,332,735 B1 | * | 12/2001 | Wang | 403/371 |

FOREIGN PATENT DOCUMENTS

| | | | | |
|---|---|---|---|---|
| GB | 2328913 A | * | 10/1999 | 74/551.1 |
| JP | 8-290793 | | * 11/1996 | 74/551.1 |

* cited by examiner

*Primary Examiner*—Vinh T. Luong
(74) *Attorney, Agent, or Firm*—Rosenberg, Klein & Lee

(57) ABSTRACT

A head set assembly for bicycles includes a bearing set with balls received between an upper race and a lower race which is connected to an end of a head tube of a bicycle. The upper race has an annular inclined surface and an annular vertical inside. A pressing ring has an inclined outer surface for being engaged with the annular inclined surface of the upper race, and a flange extending from the inclined outer surface. The flange of the pressing ring is matched with the annular vertical inside of the upper race. The flange is mounted to a steerer tube extending through the head tube. A dust cap is connected onto a top of the pressing ring and a skirt of the dust cap encloses the lower race of the bearing set.

1 Claim, 6 Drawing Sheets

HEAD SET ASSEMBLY FOR BICYCLES

FIELD OF THE INVENTION

The present invention relates to a head set for bicycles and the head set includes an annular flange of a pressing ring located between the steerer tube and the bearing set to reduce the impact or wear therebetween.

BACKGROUND OF THE INVENTION

A conventional head set assembly for bicycles is shown in FIG. 1 and generally includes two bearing sets 20 respectively connected to two ends of the head tube 25 and a steerer tube 24 extends through the two bearing sets 20 via the head tube 25. A handlebar assembly (not shown) is connected to the steerer tube 24 so that when turning the handlebar assembly, the steerer tube 24 turns. A race of the bearing set 20 has an inclined surface 21 and a pressing ring 22 is engaged with the inclined surface 21. A dust cap 23 is mounted to the pressing 22 so as to exert a downward force to position the bearing set 20. The steerer tube 24 directly contacts the inner surface 26 of the race of the bearing set 20. There are wear and impact happened between the race and the steerer tube 24 so that it requires a precise installment between the bearing set 20 and the steerer tube 24. Any small gap between the bearing set 20 and the steerer tube 24 will accelerate the wear therebetween and cause the bearing set 20 to be worn out or even broken.

SUMMARY OF THE INVENTION

In accordance with one aspect of the present invention, there is provided a head set assembly for bicycles and the head set assembly comprises a bearing set connected to the head tube of the bicycle and comprises balls received between an upper race and a lower race. The upper race has an annular inclined surface and an annular vertical inside. A pressing ring has an inclined outer surface and a flange extending from the inclined outer surface. The inclined outer surface of the pressing ring is engaged with the annular inclined surface of the upper race and the flange of the pressing ring is matched with the annular vertical inside of the upper race. The flange is mounted to a steerer tube extending through the head tube. A dust cap is connected onto a top of the pressing ring and a skirt of the dust cap encloses the lower race of the bearing set.

The primary object of the present invention is to provide a head set assembly wherein a flange of a pressing is located between the bearing set and the steerer tube so as to reduce the impact and wear therebetween.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
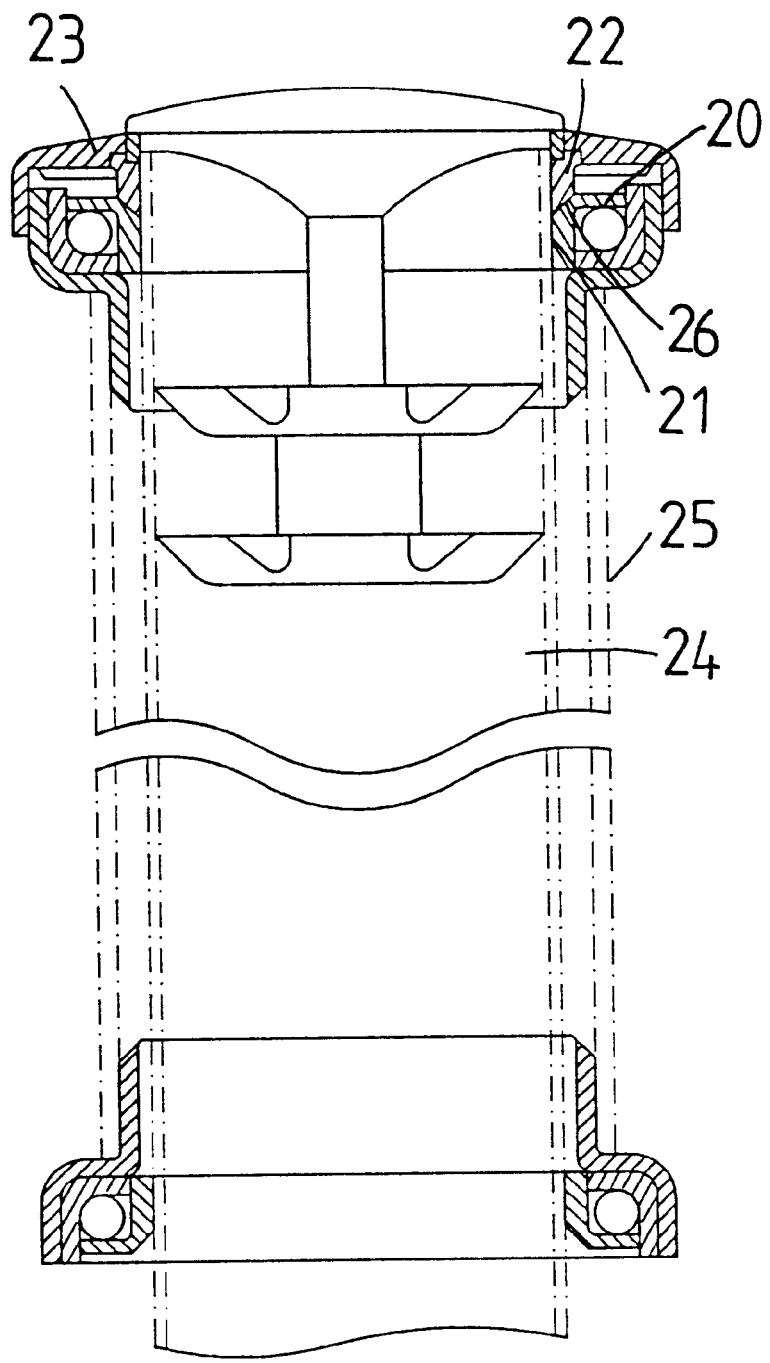
FIG. 1 is a cross sectional view to show a conventional head set assembly for bicycles.

Referring to FIGS. 2 to 5, the head set assembly of the present invention comprises an upper head set assembly 1 and a lower head set assembly 2. The upper head set assembly 1 is connected to an upper end of the head tube 13 of the bicycle and the lower head set assembly 2 is rested on the crown portion of the front fork and connected a lower end of the head tube 13. Taken the upper head set assembly 1 as the embodiment of the present invention and which includes a bearing set comprising an upper race 6 and a lower race 4 with a plurality of balls 5 engaged between the upper race 6 and the lower race 4. The lower race 4 is connected to the upper end of the head tube 13 and the upper race 6 has an annular inclined surface 61 and an annular vertical inside 62.

A pressing ring 1B has an inclined outer surface 1F and a flange 1G extending from the inclined outer surface 1F. The inclined outer surface 1F of the pressing ring 1B is engaged with the annular inclined surface 61 of the upper race 6 and the flange 1G of the pressing ring 1B is matched with the annular vertical inside 62 of the upper race 6.

A steerer tube 14 extends through the head tube 13 and the upper head set assembly 1 and the lower head set assembly 2. The flange 1G and the inside 1C of the pressing ring 1B are snugly mounted to the steerer tube 14 extending through the head tube 13.

A dust cap 1A is connected onto a top of the pressing ring 1B and a skirt of the dust cap 1A encloses the lower race 4 of the bearing set.

A handlebar stem 12 is mounted to the top of the steerer tube 14 extending from the dust cap 1A. A positioning assembly 10 is inserted in the handlebar stem 12 and employs expanding nuts 11 to be secured in the steerer tube 14 by rotating a bolt 8 extending through a cap 9.

Figure 2:
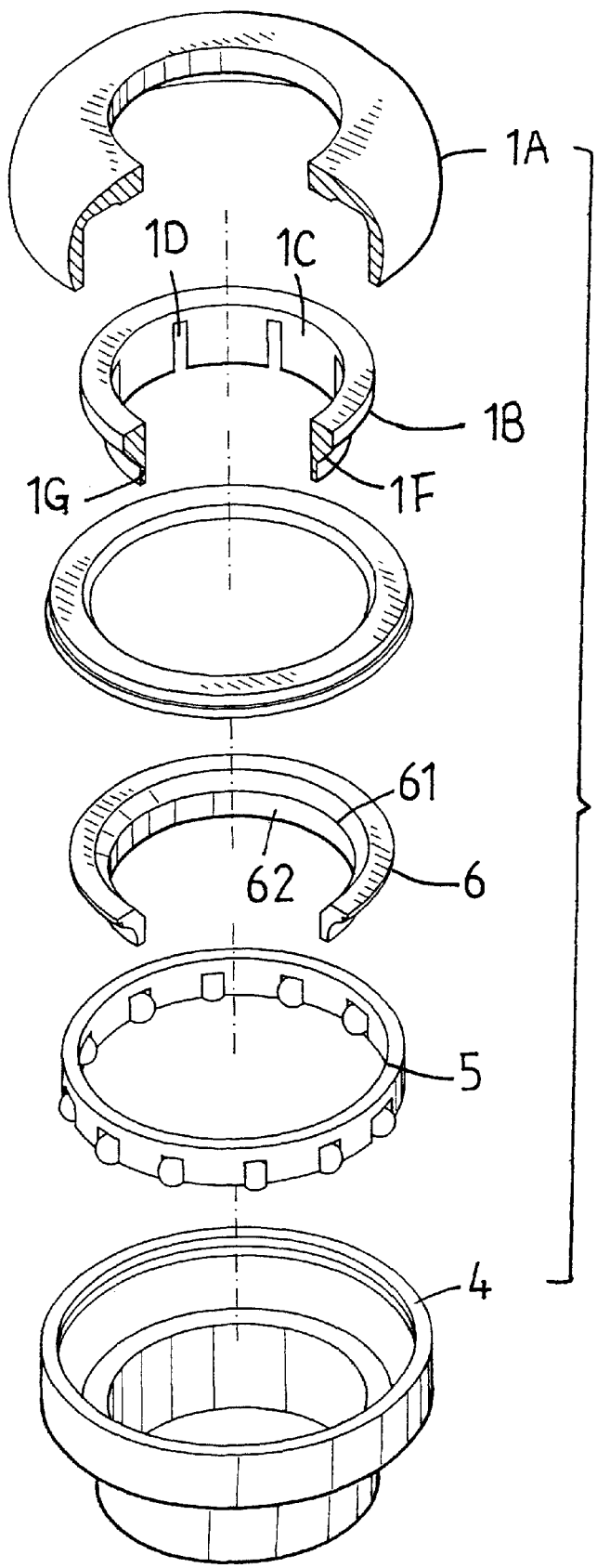
FIG. 2 is an exploded view to show head set assembly for bicycles of the present invention.
Figure 2A:
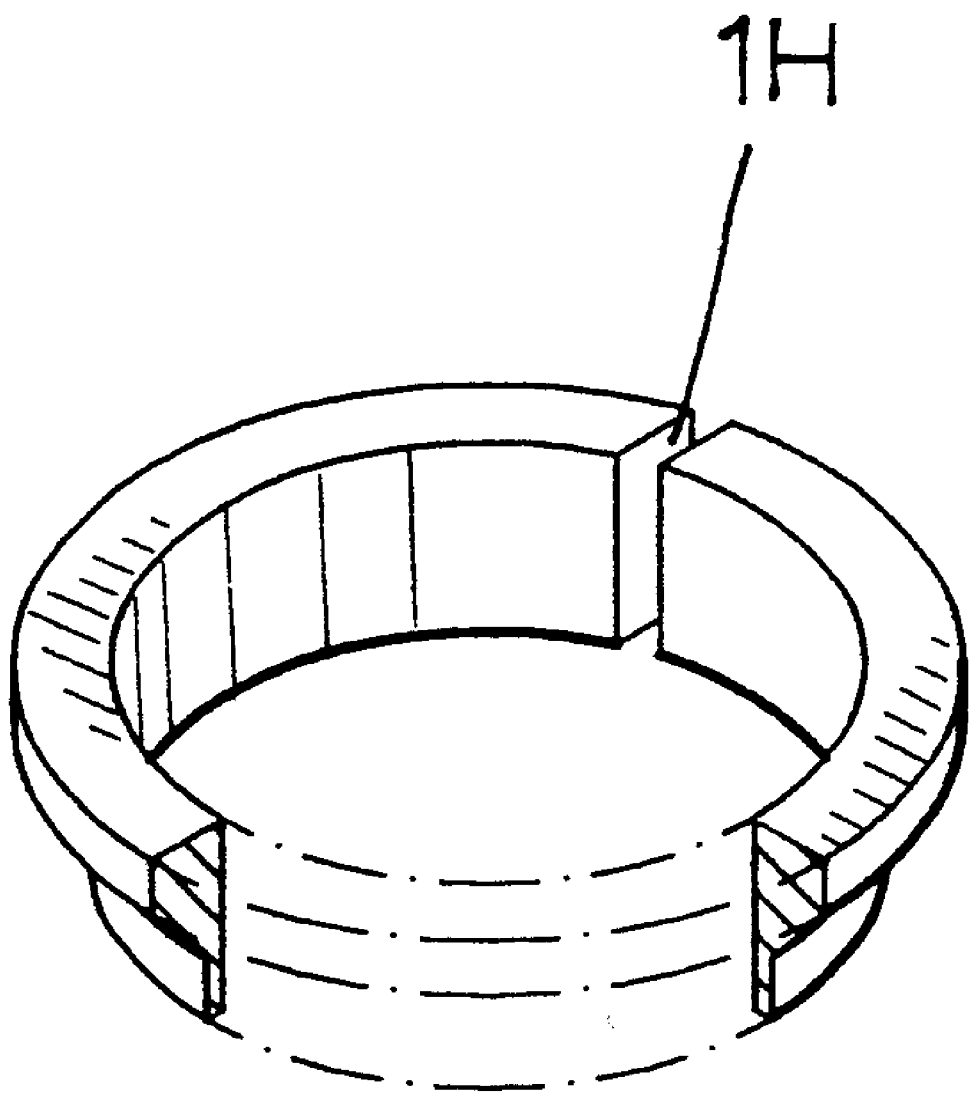
FIG. 2A shows another embodiment of the pressing ring of the present invention.
Figure 3:
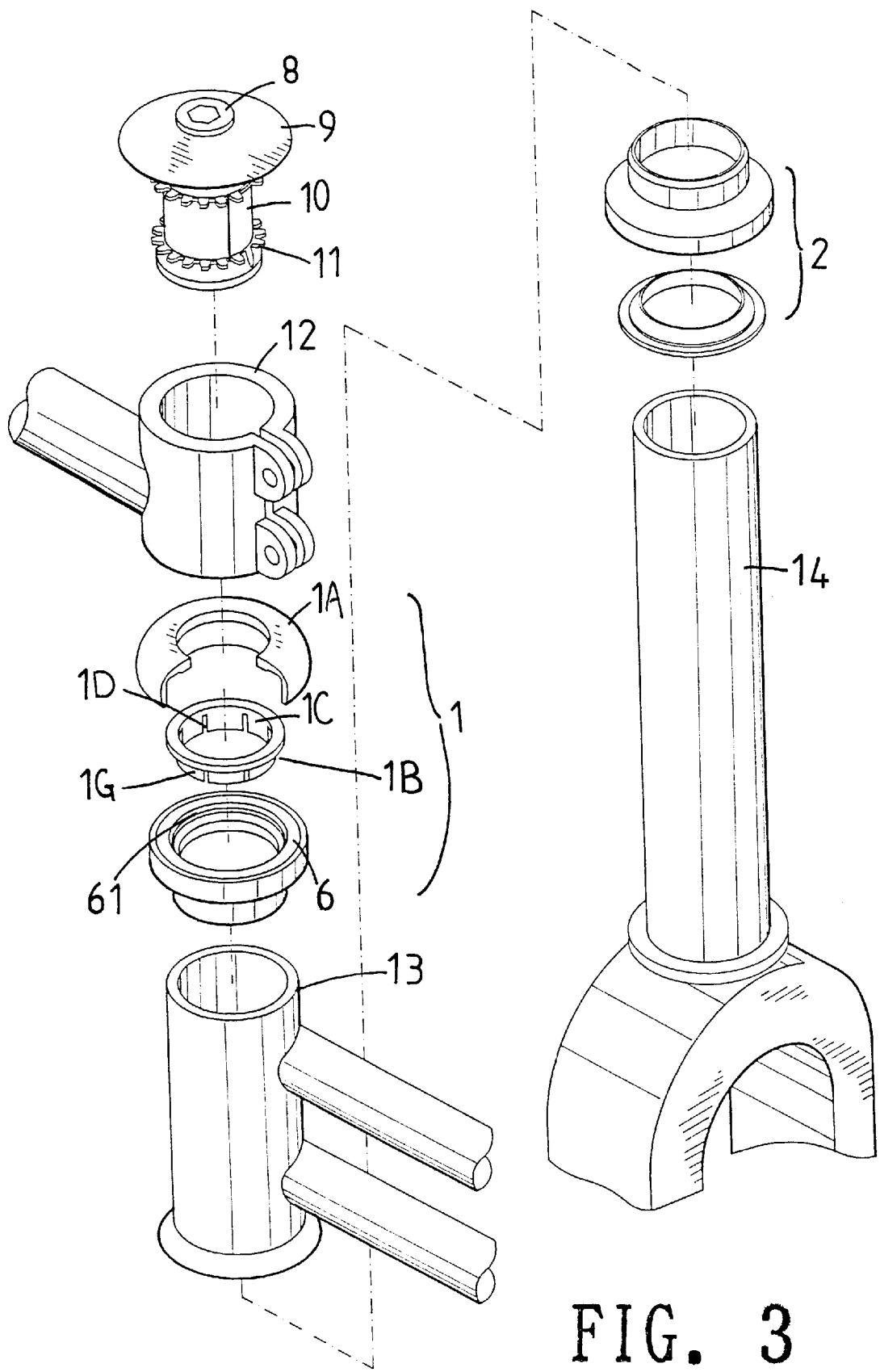
FIG. 3 is an exploded view to show head set assembly, the head tube, the steerer tube and the handlebar stem for bicycles of the present invention.
Figure 4:
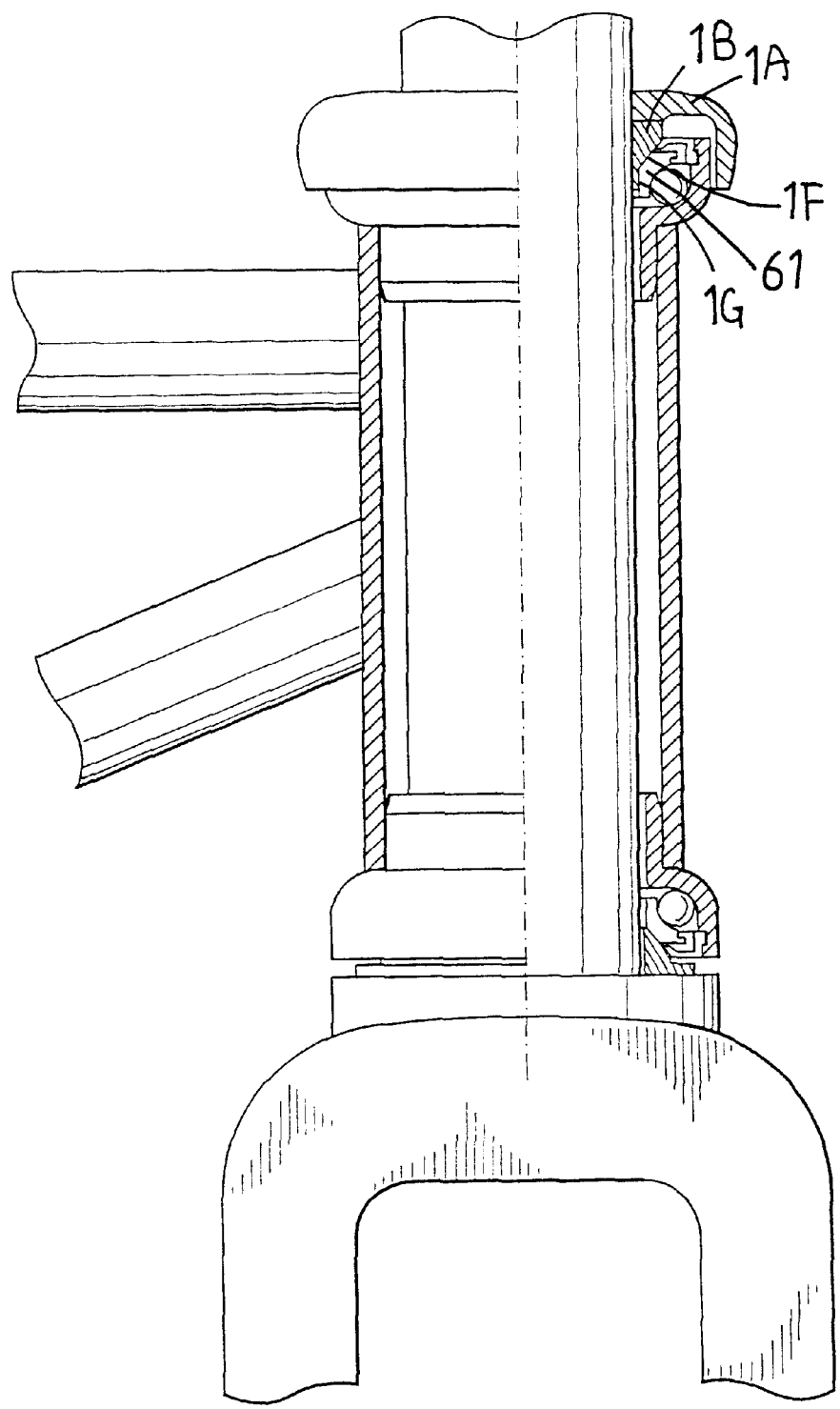
FIG. 4 is a cross sectional view to show the head set assembly for bicycles of the present invention.
Figure 5:
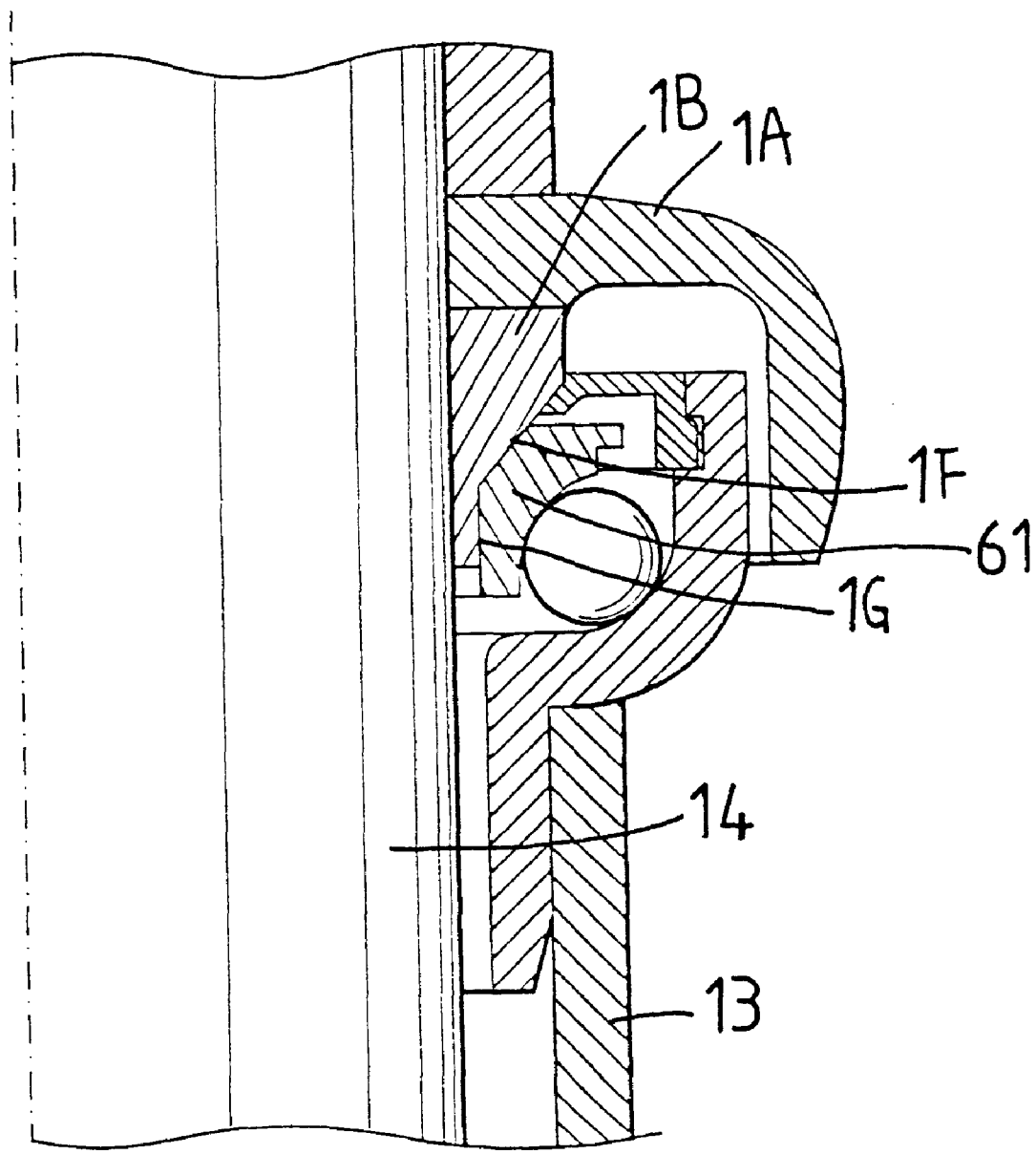
FIG. 5 shows an enlarged cross sectional view of the head set assembly for bicycles of the present invention.

In order to provide appropriated flexibility for the flange 1G, a plurality of notches 1D are defined longitudinally therein so as to absorb the minor impact or shock between the steerer tube 14 and the bearing set. As shown in FIG. 2A, the pressing ring 1B may be made to be a C-shaped member including at least one gap 1H defined through the pressing ring 1B.

While we have shown and described the embodiment in accordance with the present invention, it should be clear to those skilled in the art that further embodiments may be made without departing from the scope of the present invention.

What is claimed is:

1. A head set assembly for bicycles, comprising:

a bearing set comprising an upper race and a lower race with a plurality of balls engaged between said upper race and said lower race which is connected to an end of a head tube of a bicycle, said upper race having an annular inclined surface and an annular vertical inside;

a pressing ring having an inclined outer surface and a flange extending from said inclined outer surface, said inclined outer surface of said pressing ring engaged with said annular inclined surface of said upper race and said flange of said pressing ring matched with said annular vertical inside of said upper race, said flange mounted to a steerer tube extending through said head tube, a gap defined through the pressing ring to make the pressing to be a C-shaped pressing ring, and a dust cap connected onto a top of said pressing ring and a skirt of said dust cap enclosing said lower race of said bearing set.

* * * * *